Feb. 25, 1964 D. I. WAUGH 3,122,109
SAFETY LIGHTERS FOR BARBECUE BURNERS
Filed Oct. 8, 1959

Dale I. Waugh INVENTOR.
BY Bush & Bush
Attorneys.

United States Patent Office 3,122,109
Patented Feb. 25, 1964

3,122,109
SAFETY LIGHTERS FOR BARBECUE BURNERS
Dale I. Waugh, 1438 Lakewood Drive, Bettendorf, Iowa
Filed Oct. 8, 1959, Ser. No. 845,139
6 Claims. (Cl. 110—1)

My invention relates to an appliance for igniting fuel such as charcoal or other briquettes used in grilling or barbecuing meats, such as outdoor burners including a plate or fire bowl held at convenient heights by suitable supports.

The objects of my invention are to eliminate the need of using the explosive fluids frequently used at the present time to ignite the charcoal or briquettes used in barbecuing or grilling and the danger of injuries from burns suffered by the users of such appliances from the explosion of such liquid, inflammable fuel;

To provide simple, more economical means to ignite the charcoal or briquettes which will act more quickly and more thoroughly and evenly ignite the charcoal or briquettes and to provide increased draft for the igniter so used;

To provide a holder of light-weight sheet metal, preferably aluminized sheet steel or of aluminum anodized in any desired color;

To provide such appliances in form whereby they can be readily nested for shipment and which will be durable, easily mounted upon any base pan or bowl of a barbecue burner, and readily removable by a detachable handle from the briquettes after ignition.

It has become a common practice to ignite charcoal or briquettes in such barbecue burners by using an inflammable fluid commonly marketed in tin cans to ignite the charcoal. Many injuries have been suffered by users thereof from explosions of such fluids or of the vapors therefrom.

I accomplish these objects by the means illustrated in the accompanying drawings, in which.

Similar numerals refer to similar parts throughout the several views.

My appliance comprises a housing or tapered cylinder 1 of sheet metal preferably aluminized or galvanized steel, or of aluminum which may be anodized and colored as desired.

The size and material of said housing may be varied but I prefer a size for family use having a height of about 10 inches for the tapered cylindrical housing, with a diameter at the top 3 of about 7 inches and at the bottom 2 of about 9 inches.

Three legs 4 are riveted or otherwise secured at the lower edge of the tapered housing and extend downwardly therefrom to rest upon the plate or bowl (not shown) of the burner, thereby affording a stable support for the housing even though the plate may not be entirely level.

The housing is cut from sheet metal to the proper form and the legs attached. It is then rolled into the tapered cylinder form and its edges united at 7 by crimping, welding or other desired means.

Figure 1:
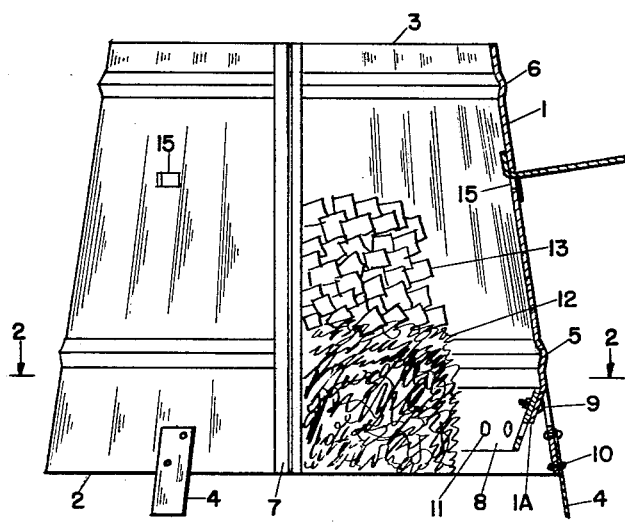
FIGURE 1 is a quartered side elevation of my apparatus partly in section.
Figure 3:
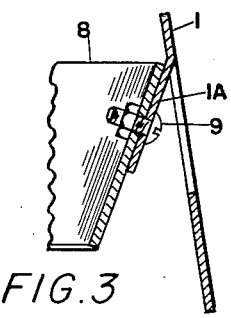
FIGURE 3 is an enlarged sectional detail of the annular flange as shown in FIGURE 1, and of the means for securing it in place.
Figure 2:
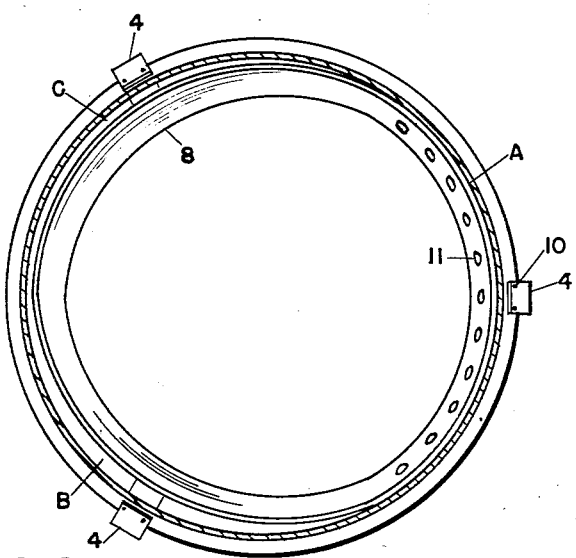
FIGURE 2 is a cross-section on the line 2—2 of FIGURE 1.
Figure 4:
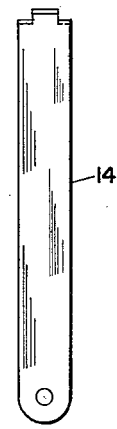
FIGURE 4 is a detail of the removable handle.

Three or more projecting ears 1A are cut in the housing and bent inwardly as in FIGURE 3. Upon these ears an annular flange 8 is secured by machine screws 9 and extend downwardly and inwardly at an angle for from one to 2 inches.

This flange may be perforated by small bores 11 as at A or it may be spaced for all or only a part of its circumference at a short distance from the housing as at either B or C. These bores and open spaces will permit a draft of air upwardly to aid in carrying the flame to and through the charcoal or briquettes.

Figure 5:
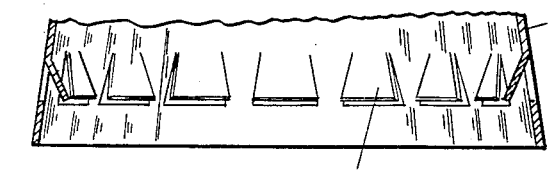
FIGURE 5 is a sectional detail showing an alternate form of annular interrupted supports in place of the annular flange.

As an alternate for the flange 8, a plurality of ears or projections 16 may be formed by slitting the housing 1 and projecting portions inwardly and downwardly as shown in FIGURE 5.

These projections would be wider at their lower ends than at the upper portion thereof which would remain integral with the housing and as a part thereof. This would leave spaces between the successive projections and air entering through the spaces thus left in the housing could pass in and upwardly to form a good draft through the housing and its contents.

These projections would be from 1 to 2 inches in length and preferably spaced about half an inch from each other, but the size and spacing thereof may be varied as desired by the makers of the different sizes.

In the use of my appliance, the lower part of the housing, about one third, more or less, thereof, is lightly crammed with old dry newspapers 12 or similar material crumpled up so as to burn freely.

Charcoal or briquettes 13 are then inserted in the desired quantity above the paper, etc., and sometimes hickory chips are used in place of briquettes. The housing thus loaded is then stood up on the plate or bowl of the brazier burner and a lighted match or matches inserted in several places between the legs under the edge of the housing to light the paper or other inflammable material there placed.

The natural draft carries the flames and gases from the burning material upwardly into and through the charcoal or briquettes or other fuel, to the upper part of the housing where the draft passes on up through the open top.

Continued experience has shown that my appliances used as described, will thoroughly ignite charcoal or briquettes in about half the time required to ignite them thoroughly by the use of the canned inflammable liquids referred to and commonly marketed for that purpose. They will also eliminate any danger of burns from explosions.

When the paper has burned and the charcoal has been sufficiently ignited, it descends to the bowl or plate of the burner. The handle is then applied to the housing and the housing lifted off. This allows the burning charcoal to spread out on the plate or bowl of the burner as desired and the grate or grill may then be applied with the meat thereon as shown.

The handle 14 is preferably made of a short bar of metal with an upturned prong at one end thereof adapted to enter into one of a number of rectangular openings 15 formed in the upper part of the housing and with additional prongs extending downwardly to contact the outside of the housing by which it may be conveniently lifted.

The handle may be kept separate from the housing while the fire is being ignited so as to keep it cool. It may be provided with a small opening in the free end thereof whereby it may be hung up on a nail or peg for storage if desired.

Various modifications may be made in the size, shape and material of the various parts without departing from the spirit of my invention as expressed in the claims, and I do not limit my claims to the precise forms shown in the drawings.

I claim:

1. A safety appliance for use in igniting charcoal or briquettes used in barbecuing meats, comprising a vertically, upwardly tapered cylindrical sheet metal housing open at the top and bottom, with a plurality of legs extending a short distance below the lower edge of the housing adapted to rest upon the plate or bowl of a barbecue burner with an inner annular flange united to the housing near the lower edge thereof and inclining inwardly and downwardly.

2. A safety appliance for use in igniting charcoal or briquettes used in barbecuing meats, comprising a vertically, upwardly tapered cylindrical sheet metal housing open at the top and bottom, with a plurality of legs extending a short distance below the lower edge of the housing adapted to rest upon the plate or bowl of a barbecue burner, with the housing being about 8 to 9 inches in diameter at the top, about 12 inches in diameter at the bottom and about 10 inches in height, and a plurality of projections of part of the housing extending inwardly and downwardly from one to two inches in length, formed in the housing near the lower edge thereof by slitting the housing and bending the slitted portions thereof inwardly in a row and spaced about one-quarter of an inch apart whereby an upward draft of air will be permitted between and around the projections one or more small rectangular openings in the upper part of the housing with a separable flat bar handle having an upturned prong at one end adapted to enter into one of said openings and an intermediate downwardly extending prong adjacent thereto outside of said opening whereby the housing may be lifted and removed after the paper has burned and ignited the charcoal.

3. The combination in a charcoal lighter for barbecue grills, of a vertically, upwardly tapered cylindrical sheet metal housing open at the top and bottom, with a plurality of legs extending a short distance below the lower edge of the housing adapted to rest upon the plate or bowl of a barbecue burner, with an inner annular flange united to the housing near the lower edge thereof and inclining inwardly and downwardly, and a horizontal slot cut in one side of the housing near the top thereof adapted to readily receive and hold against its inner surface as well as to release when desired an upturned prong on one end of a flat bar handle having adjacent downturned prongs adapted to bear against the outer surface of the housing whereby the housing may be removed and its burning fuel content deposited upon the bowl of the burner.

4. A safety lighter for charcoal barbecue grills having an upwardly tapered cylindrical metal housing open at top and bottom adapted to stand upon the bottom of the bowl of the grill in combination with a handle mounted upon the housing comprising a flat metal handle bar having oppositely turned prongs at one end thereof one of which enters a horizontal slot formed in the upper part of the housing and bears against the inner side thereof above the slot and the other bears against the outer side of the housing below the slot, whereby the weight of the housing will hold it fast in the grip of the prongs when the handle bar is held in horizontal position, with an inner annular flange united thereto near the lower edge and inclining at an angle inwardly and downwardly from one to two inches, with slitted openings formed in the housing by portions of the housing being bent inwardly and to which the annular flange may be secured by machine screws, and with openings in the flange and a space at the upper edge of the flange and between the flange and the housing to permit passage of air upwardly for draft purposes.

5. A safety lighter for charcoal barbecue grills having an upwardly tapered cylindrical metal housing open at top and bottom adapted to stand upon the bottom of the bowl of the grill in combination with a handle mounted upon the housing comprising a flat metal handle bar having oppositely turned prongs at one end thereof one of which enters a horizontal slot formed in the upper part of the housing and bears against the inner side thereof above the slot and the other bears against the outer side of the housing below the slot, whereby the weight of the housing will hold it fast in the grip of the prongs when the handle bar is held in horizontal position, with an inner annular flange united to the tapered metal housing near the lower edge thereof and inclining at an angle inwardly and downwardly.

6. The safety appliance as described in claim 5, with slitted openings formed in the housing by portions of the housing being bent inwardly and to which the annular flange may be secured by machine screws.

References Cited in the file of this patent
UNITED STATES PATENTS

| | | |
|---|---|---|
| 152,866 | Preater | July 7, 1874 |
| 964,554 | Reuter et al. | July 19, 1910 |
| 1,134,905 | Prochaska | Apr. 6, 1915 |
| 1,667,973 | Kircher | May 1, 1928 |
| 1,934,339 | Winberg | Nov. 7, 1933 |
| 2,613,978 | Marulli | Oct. 14, 1952 |
| 2,920,614 | Phelps | Jan. 12, 1960 |
| 2,939,773 | Rymer | June 7, 1960 |

FOREIGN PATENTS

| | | |
|---|---|---|
| 1,111 | Great Britain | Apr. 10, 1869 |
| 17,067 | Great Britain | 1910 |

OTHER REFERENCES

Fritos Publication "Outdoor Cooking Ideas," page 5.